US008332196B2

(12) United States Patent
Sibecas et al.

(10) Patent No.: US 8,332,196 B2
(45) Date of Patent: Dec. 11, 2012

(54) METHOD AND APPARATUS FOR ENHANCING THE ACCURACY AND SPEED OF A RAY LAUNCHING SIMULATION TOOL

(75) Inventors: Salvador Sibecas, Lake Worth, FL (US); Alexander Bijamov, Plantation, FL (US); Celestino A. Corral, Ocala, FL (US); Glafkos Stratis, Lake Worth, FL (US)

(73) Assignee: Motorola Mobility LLC, Libertyville, IL (US)

( * ) Notice: Subject to any disclaimer, the term of this patent is extended or adjusted under 35 U.S.C. 154(b) by 955 days.

(21) Appl. No.: 11/948,636

(22) Filed: Nov. 30, 2007

(65) Prior Publication Data

US 2009/0144037 A1 Jun. 4, 2009

(51) Int. Cl.
*G06F 17/50* (2006.01)
(52) U.S. Cl. .......................................................... 703/13
(58) Field of Classification Search .............. 703/2, 6, 703/13; 455/446, 67.16; 702/57
See application file for complete search history.

(56) References Cited

U.S. PATENT DOCUMENTS

| | | | |
|---|---|---|---|
| 5,574,466 A * | 11/1996 | Reed et al. | 342/359 |
| 5,828,960 A | 10/1998 | Tang et al. | |
| 5,831,874 A | 11/1998 | Boone et al. | |
| 6,161,018 A | 12/2000 | Reed et al. | |
| 6,487,417 B1 | 11/2002 | Rossoni et al. | |
| 6,646,989 B1 | 11/2003 | Khotimsky et al. | |
| 6,751,322 B1 | 6/2004 | Carlbom et al. | |
| 7,912,982 B2 | 3/2011 | Murphy et al. | |
| 2002/0094809 A1 | 7/2002 | Watanabe et al. | |
| 2002/0107663 A1 | 8/2002 | Furukawa et al. | |
| 2002/0138247 A1 | 9/2002 | Payton et al. | |
| 2003/0091001 A1 | 5/2003 | Watanabe | |

(Continued)

FOREIGN PATENT DOCUMENTS

KR   10-2001-0011922 A1   2/2001

(Continued)

OTHER PUBLICATIONS

Seong-Cheol Kim; Guarino, B.J., Jr.; Willis, T.M., III; Erceg, V.; Fortune, S.J.; Valenzuela, R.A.; Thomas, L.W.; Ling, J.; Moore, J.D.; , "Radio propagation measurements and prediction using three-dimensional ray tracing in urban environments at 908 MHz and 1.9 GHz," Vehicular Technology, IEEE Transactions on , vol. 48, No. 3, pp. 931-946, May 1999.*

(Continued)

*Primary Examiner* — Kandasamy Thangavelu
*Assistant Examiner* — Luke Osborne
(74) *Attorney, Agent, or Firm* — Pablo Meles; Sylvia Chen (57) ABSTRACT

A method (600) and simulation tool (200) having enhanced accuracy and speed for simulation using ray launching in a mixed environment (20) by using adaptive ray expansion mechanisms can include a memory (204) coupled to a processor (202). The processor can select (602) a target area within the mixed environment and modify (604) the propagation properties of the adaptive ray expansion mechanisms according to characteristics classified for the target area. The processor can further classify characteristics for the target area by transmitting and reflecting rays for indoor building regions and for outdoor building regions. The number of bounces or a power level threshold assigned to a transmitted ray is a function of the environment where it propagates. The simulation tool can determine the target area or a region of interest by using a global positioning service device (230) externally attached to a device performing functions of the simulation tool.

20 Claims, 5 Drawing Sheets

U.S. PATENT DOCUMENTS

| | | | |
|---|---|---|---|
| 2003/0220745 | A1 | 11/2003 | Campbell |
| 2004/0259554 | A1 | 12/2004 | Rappaport et al. |
| 2005/0068545 | A1 | 3/2005 | Niu et al. |
| 2005/0083858 | A1 | 4/2005 | Loa et al. |
| 2005/0088165 | A1 | 4/2005 | Watanabe et al. |
| 2006/0148429 | A1 | 7/2006 | Inogai et al. |
| 2006/0224304 | A1 | 10/2006 | Hudson, Jr. et al. |
| 2007/0093212 | A1 | 4/2007 | Sugahara |
| 2007/0196072 | A1 | 8/2007 | Zhou et al. |
| 2008/0076370 | A1 | 3/2008 | Kotecha et al. |
| 2008/0132174 | A1 | 6/2008 | Corral et al. |
| 2008/0170511 | A1 | 7/2008 | Shorty et al. |
| 2009/0167756 | A1 | 7/2009 | Bijamov et al. |
| 2009/0296719 | A1 | 12/2009 | Maier et al. |
| 2010/0003991 | A1 | 1/2010 | Pao et al. |

FOREIGN PATENT DOCUMENTS

| | | | |
|---|---|---|---|
| WO | 9744977 | A1 | 5/1997 |

OTHER PUBLICATIONS

Magdy Iskander and Zhengqing Yun, Propagation Prediction Models for Wireless Communication Systems, IEEE Transactions on Microwave Theory and Tech., Mar. 2002, pp. 662-672, vol. 50 No. 3.

Paul S. Heckbert and Pat Hanrahan, Beam Tracing Polygonal Objects, Proc. on SIGGRAPH, Jul. 1984, pp. 119-127, vol. 18 No. 3.

Patent Cooperation Treaty, "PCT Search Report and Written Opinion of the International Searching Authority" for International Application No. PCT/US2008/083297, Apr. 27, 2009, 11 pages.

Wikipedia, "Diffraction" entry, Wikipedia http://en.wikipedia.org/wiki/Diffraction, downloaded Aug. 2, 2010, 10 pages.

Henry L. Bertoni et al., UHF Propagation Prediction for Wireless Personal Communications, Proc. IEEE, Sep. 1994, pp. 1333-1359, vol. 82 No. 9.

Thomas Kurner et al., Concepts and Results for 3D Digital Terrain-Based Wave Propagation Models: An Overview, IEEE J. on Selected Areas in Comm., Sep. 1993, pp. 1002-1012, vol. 11 No. 7.

Jeremy G. Siek et al., The Boost Graph Library: User Guide and Reference Manual, Dec. 20, 2001, Section 21: Algorithms; Sub-Section 19: astar_search, 10 pages, Addison-Wesley Professional.

Maggie M. Li et. al., A Three-Dimensional (3-D) Substrate-Guided-Wave to Free-Space Multistage Optoelectronic Interconnection Using Wavelength Division Multiplexing and Space Division Demultiplexing, IEEE J. Lightwave Tech., Mar. 1996, pp. 365-369, vol. 14 No. 3.

Patent Cooperation Treaty, "PCT Search Report and Written Opinion of the International Searching Authority" for International Application No. PCT/US2008/086956, Dec. 16, 2008, 9 pages.

Georgia E. Athanasiadou and Andrew R. Nix, A Novel 3-D Indoor Ray-Tracing Propagation Model: The Path Generator and Evaluation of Narrow-Band and Wide-Band Predictions, IEEE Transactions on Vehicular Tech., Jul. 2000, pp. 1152-1168, vol. 49 No. 4.

George Liang and Henry L. Bertoni, A New Approach to 3-D Ray Tracing for Propagation Prediction in Cities, IEEE Transactions on Antennas and Propagation, Jun. 1998, pp. 853-863, vol. 46 No. 6.

F. Escarieu et al., Outdoor and Indoor Channel Characterization by a 3D Simulation Software, IEEE Int'l Symp. on Personal, Indoor and Mobile Comm. (PIMRC), Sep. 2001, pp. 360-364.

Raymond J. Luebbers, Propagation Prediction for Hilly Terrain Using GTD Wedge Diffraction, IEEE Transactions on Antennas and Propagation, Sep. 1984, pp. 951-955, vol. AP-32 No. 9.

United States Patent and Trademark Office, "Non-Final Rejection" for U.S. Appl. No. 11/967,426, Jun. 10, 2011, 15 pages.

United States Patent and Trademark Offce, "Non-Final Rejection" for U.S. Appl. No. 11/967,426, Dec. 21, 2011, 26 pages.

Michael C Lawton and J.P. McGeehan, "The Application of a Deterministic Ray Launching Algorithm for the Prediction of Radio Channel Characteristics in Small-Cell Environments", IEEE Transactions on Vehicular Tech., Nov. 1994, pp. 955-969, vol. 43 No. 4.

Ulrich Dersch and Ernst Zollinger, "Propagation Mechanisms in Microcell and Indoor Environments", IEEE Transactions on Vehicular Tech., Nov. 1994, pp. 1058-1066, vol. 43 No. 4.

Zhijun Zhang et al , "Ray Tracing Method for Propagation Models in Wireless Communication Systems", Electionics Letters, Mar. 2, 2000, pp. 464-465. vol. 36 No. 5.

Francisco Saez de Adana et al., "Propagation Model Based on Ray Tracing for the Design of Personal Communication Systems in Indoor Environments", IEEE Transactions on Vehicular Tech., Nov. 2000, pp. 2105-2112, vol. 49 No. 6.

R Hoppe et al., "Wideband Propagation Modelling for Indoor Environments and for Radio Transmission into Buildings", Personal, Indoor and Mobile Radio Communications (PIMRC) 2000, pp. 282-286, vol. 1.

V. Sampath et al., "Comparison of Statistical and Deterministic Indoor Propagation Prediction Techniques with Field Measurements", Vehicular Tech. Conf. 1997, pp. 1138-1142, vol. 2.

William H. Press et al., Chapter 9 of "Numerical Recipes in C", 1992, pp. 347-393, Cambridge University Press.

Science Applications International Corporation, "Urbana 3-D Wireless Toolkit", http://www.saic.com/products/software/urbana/, printed Aug. 23, 2010, 2 pages.

Takeshi Manabe et al., "Effects of Antenna Directivity and Polarization on Indoor Multipath Propagation Characteristics at 60 GHz", IEEE J. on Selected Areas in Communications, vol. 14, No. 3, pp. 441-448, Apr. 1996.

Patent Cooperation Treaty, "PCT Search Report and Written Opinion of the International Searching Authority" for International Application No. PCT/US2007/082183, Mar. 31, 2008, 12 pages.

United States Patent and Trademark Office, "Non-Final Rejection" for U.S. Appl. No. 11/749,054, Jul. 8, 2010, 36 pages.

United States Patent and Trademark Office, "Notice of Allowance and Fee(s) Due" for U.S. Appl. No. 11/749,054, Feb. 9, 2011, 9 pages.

* cited by examiner

- SELECT A TARGET AREA WITHIN THE MIXED ENVIRONMENT 602

- MODIFY THE PROPAGATION PROPERTIES OF THE ADAPTIVE RAY EXPANSION MECHANISM (SUCH AS BOUNCES) ACCORDING TO CHARACTERISTICS CLASSIFIED FOR THE TARGET AREA. 604

- CLASSIFY CHARACTERISTICS (BY A USER OR BY A RAY-LAUNCHING ENGINE) FOR THE TARGET AREA INCLUDING TRANSMITTING & REFLECTING RAYS FOR INDOOR AND OUTDOOR BUILDING REGIONS WHERE THE NUMBER OF BOUNCES ASSIGNED TO A TRANSMITTED RAY CAN BE A FUNCTION OF THE ENVIRONMENT WHERE IT PROPAGATES. 606

- DETERMINE A NUMBER OF FACETS ENCLOSED WITHIN A REGION AND THEIR HEIGHT IN ORDER TO APPROXIMATE A DENSITY AND AN AVERAGE HEIGHT OF BUILDINGS IN A REGION 608

- USE THE NUMBER OF FACETS ENCLOSED WITHIN THE REGION & THE STATISTICS OBTAINED INCLUDING THE AVERAGE HEIGHT OF BUILDINGS IN REGION & A STANDARD DEVIATION ALONG WITH PARAMETERS STORED IN A TABLE TO CLASSIFY THE ENVIRONMENT FOR THE REGION 610

- CHARACTERISTICS CAN BE BASED ON LAUNCHING RAYS ALONG A Z-AXIS FROM EACH RECEIVER AND DETERMINING IF RAY INTERSECTS A TRIANGULAR FACET TO DECIDE A PERCENTAGE OF RECEIVERS INSIDE BUILDINGS & COMPUTE A DENSITY & AN AVG. HEIGHT IN THE TARGET AREA. 612

- USER SELECTS RAYS AS ABLE TO PENETRATE A BUILDING & TO ONLY GENERATE TRANSMISSIONS TO IMPROVE SIMULATION SPEED WITHOUT DEGRADING ACCURACY. 614

- A USER SELECTS RAYS AS ABLE TO PENETRATE A BUILDING STRUCTURE TO ONLY GENERATE TRANSMISSIONS AFTER A PRESET NUMBER OF TRANSMISSIONS. 616

- IDENTIFY THE TARGET AREA BY MANUAL INPUT BY A USER OR BY A LOCATION FINDING DEVICE EXTERNALLY ATTACHED TO A DEVICE PERFORMING THE SIMULATION. 618

METHOD AND APPARATUS FOR ENHANCING THE ACCURACY AND SPEED OF A RAY LAUNCHING SIMULATION TOOL

FIELD

This invention relates generally to shoot and bounce ray (SBR) simulations, and more particularly to accurate and faster simulation techniques.

BACKGROUND

Current trends in wireless technology require that a propagation tool perform indoor and outdoor analysis simultaneously. For example, to determine when to hand off a call between an outdoor WAN (wide area network) and an indoor WLAN based on the received power. Currently, ray tracing tools let the user set a fix number of bounces per ray. These parameters allow the tool to determine when to stop tracing and storing information on any given ray in order to save memory space and time. These two mechanisms work well on single environment studies (for either outdoor alone or indoor alone studies), but are extremely inefficient, using more bounces than is needed in outdoor environments, or inaccurate, using a low number of bounces per ray, in an indoor environment. Current tools have not come up with techniques to improve accuracy and efficiency in mixed environments.

SUMMARY

Embodiments in accordance with the present invention can provide a method and system for using a ray tracing tool that incorporates a procedure that enables the tools to change the duration of a ray based on the propagation environment encountered (for simulation).

In a first embodiment of the present invention, a method to enhance the accuracy and speed of a ray launching simulation tool for simulations in a mixed environment by using adaptive ray expansion mechanisms includes the steps of selecting a target area within the mixed environment and modifying the propagation properties of the adaptive ray bounces according to characteristics classified for the target area. The method can further include the step of classifying characteristics for the target area including transmitting and reflecting rays for indoor building regions and for outdoor building regions. The adaptive ray expansion mechanisms can be done by measuring the number of bounces assigned to a transmitted ray or by making adjustments to a power level threshold and either can be a function of the environment where a bounce propagates. The characteristics classified for the target area can be assigned by a user of the ray launching simulation tool. The characteristics classified for the target area can be assigned by a ray-launching engine of the ray launching simulation tool. The method can use the characteristics classified for the target area to determine a number of facets enclosed within a region and their height in order to approximate a density and an average height of buildings in a region. In one particular embodiment, the characteristics classified can be based on launching rays along a z-axis from each receiver and determining if the ray intersects a triangular facet in order to decide a percentage of receivers located inside buildings and as a result compute a density and an average height of a building in the region of interest. A process of classifying characteristics in a region uses the number of facets enclosed within the region and the statistics obtained including the average height of buildings in the region and a standard deviation along with parameters stored in a table in order to classify the environment for the region. The information available on each facet is used to determine exterior and interior regions of an object and thereby resulting in a predetermined number of bounces per ray in a given region. In another aspect a user can select rays as able to penetrate a building structure and to only generate transmissions in order to improve simulation speed without significantly degrading accuracy of simulation results. Alternatively or optionally, a user can select rays as able to penetrate a building structure to only generate transmissions after a preset number of transmissions. Rays can be classified as reflected and transmitted and a number of allowed bounces or a power threshold originally assigned to a transmitted ray is only incremented for reflected rays for both indoor and outdoor but not for transmitted rays inside buildings. Note the target area or a region of interest can be manually input by a user or can be provided by a location finding device externally attached to a device performing the methods herein.

In a second embodiment of the present invention, a simulation tool having enhanced accuracy and speed for simulation using ray launching in a mixed environment by using adaptive ray expansion mechanisms can include a memory coupled to a processor. The processor can be operative to select a target area within the mixed environment and modify the propagation properties of the adaptive ray bounces according to characteristics classified for the target area. The processor can be further operative to classify characteristics for the target area by transmitting and reflecting rays for indoor building regions and for outdoor building regions. As noted above, the adaptive ray expansion mechanisms can be done by measuring a number of bounces assigned to a transmitted ray or by making adjustments to a power level threshold where either can be a function of the environment where it propagates. The location information can be transferred into a device running the simulation via a wireless local area network. Note that the simulation tool can determine the target area or a region of interest by using a global positioning service device externally attached to a device performing functions of the simulation tool.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. Adaptive ray expansion mechanisms can be bounces or the measurement of bounces assigned to a transmitted ray or alternatively or optionally a power level threshold adjustment where such functions are a result of the environment where a particular bounce propagates.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements. The "propagation properties" can include a number of factors that can include knowing if an environment is indoor or outdoors, weather conditions, and the nature of a particular surface among other factors effecting the propagation of a ray. An "adaptive ray expansion mechanism" can include the adjustment of a number of bounces for either reflected or transmitted rays or the adjustment of power thresholds or other modifying mechanisms as a function of the environment where a bounce might propagate. A "target area or region" can be a defined as an area that can be as specific as being within a building or an object or can include a number of objects or buildings as desired that can be in a particular area such as a downtown area. Of course, the target area or region can be user defined and include as small or as large of an area as desired for analysis whether the area includes buildings or not. A mixed environment would include objects within an area that would likely include indoor and outdoor environments.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 6 is flow chart illustrating a method to enhance the accuracy and speed of a ray launching simulation tool for simulations in a mixed environment by using adaptive ray bounces in accordance with an embodiment of the present invention.

DETAILED DESCRIPTION OF THE DRAWINGS

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways using a variety of methods that can be integrated with signal bounce ray tools used for near real world radio frequency (RF) simulations. A number of aspects herein can further provide a smart computational engine to render information to a user in a timely manner by avoiding unnecessary computations. After a certain number of ray bounces in certain environments, the information gathered provides diminishing returns that are not worth the additional computation.

There are a number of aspects developed herein that in the end reduces the computational overhead to provide a quicker result. The methods used in several embodiments can localize areas of interest as well as take into account material coefficients (metal versus fabric) as well as location of structure (e.g., outside wall versus inside wall). There are a number of references within the academic world that have developed or use RF simulation engines, but none of the art known describes the ability to reduce the time for the computation since the practicalities of real world conditions are not being fully considered. NEC along with a number of other companies offer site survey tools, but none of the applications provides options to reduce computation time.

A ray launching tool in accordance with various embodiments herein distinguishes between environments or regions where it propagates, such as the exterior and interiors of buildings, and adjusts the number of bounces assigned to the rays based on this determination. The number of bounces may also be adjusted based on whether a ray is a transmitted ray (yes) or a reflected ray (no). Overall, this can help determine wave propagation predictions in various scattering environments (such as buildings). Further note that a power level threshold can also be adjusted based on environmental factors.

Through selective ray bouncing or other expansion mechanisms, both accuracy and efficiency can be improved in mixed environment simulations. The ray tracing tool can increase the number of bounces per ray where it might provide valuable information such as inside buildings or cars, and it can reduce the number of bounces per ray in an outdoor environment where a lower number of bounces still provides accurate results. In addition, the tool can generate transmissions without reflections in order to reduced simulation time if such option is selected by the user.

Additionally, in order to improve accuracy in a simulation the number of rays sent in a given direction can be made a function of the density of buildings or other environmental parameter. So in general, the number of bounces assigned to a transmitted ray, or a power threshold, or a number of rays sent in a given direction can be a function of the environment where it propagates. In one particular embodiment, only certain triangular vertices of a geodesic sphere are used to direct a transmitted ray, where the number of selected vertices will depend on the environment.

Figure 1:
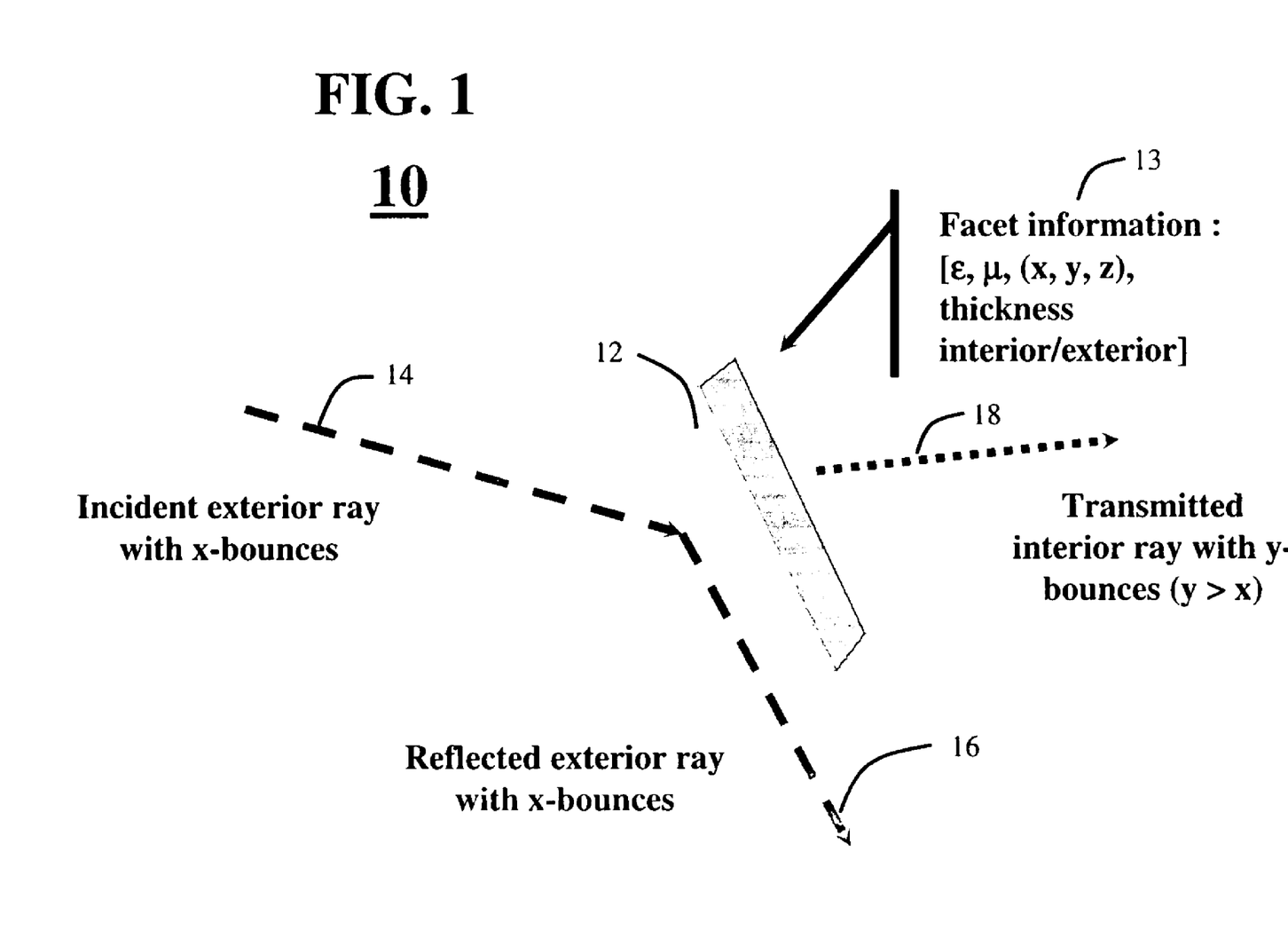
FIG. 1 is an illustration of a facet of building or an object in an environment further illustrating transmitted and reflected rays and other parameters used in accordance with an embodiment of the present invention.

Referring to FIG. 1, an illustration of a facet 12 of a building or an object in an environment illustrates an incident exterior ray 14 with a predefined number (x) of bounces, a predefined number (x) of reflected exterior rays 16, and a predefined number (y) of transmitted rays 18 where y>x. The transmitted (18) and reflected rays (16) and other parameters can be defined in a number of different ways and be used in accordance with the embodiments of the present invention.

Figure 2:
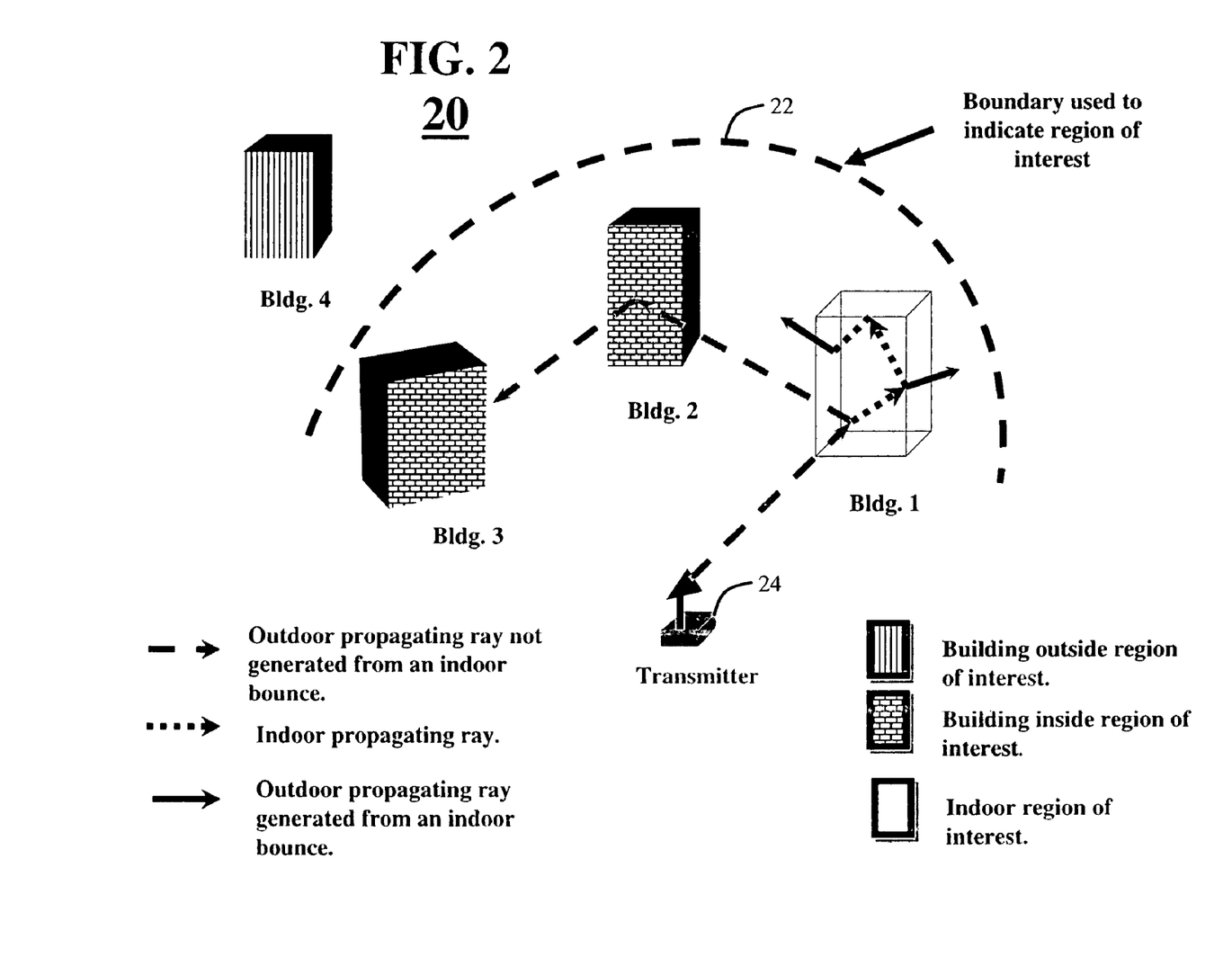
FIG. 2 is an illustration of an environment including a target area or region of interest along with propagating rays in accordance with an embodiment of the present invention.

Referring to FIG. 2, a mixed environment 20 is illustrated having a number of buildings and a defined boundary used to indicate a target area or region of interest 22. The mixed environment can include a number of buildings for example that are within (buildings 1-3) the target area and outside (building 4) the target area 22. A transmitter 24 can initiate an incident ray and subsequently generate outdoor propagating rays not generated from indoor bounces, indoor propagating rays, and indirectly generate outdoor propagating rays generated from indoor bounces. A simulation tool in accordance with embodiments herein can completely ignore buildings outside the target area or apply different rules to such buildings. Likewise, the tool can apply different rules to buildings within the target area 22 and also define rules to specific buildings and the rules that apply to the indoor bounces or outdoor propagating rays generated from indoor bounces for a particular building of interest.

Figure 3:
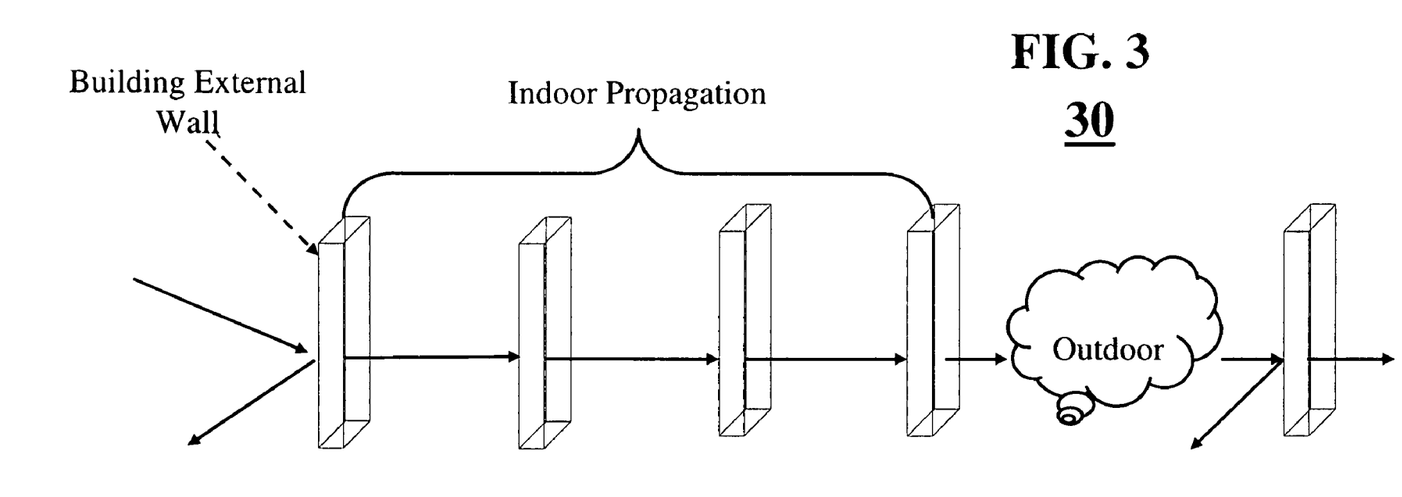
FIG. 3 is an illustration of an environment illustrating different predefined ray propagations as used in accordance with an embodiment of the present invention.
Figure 4:
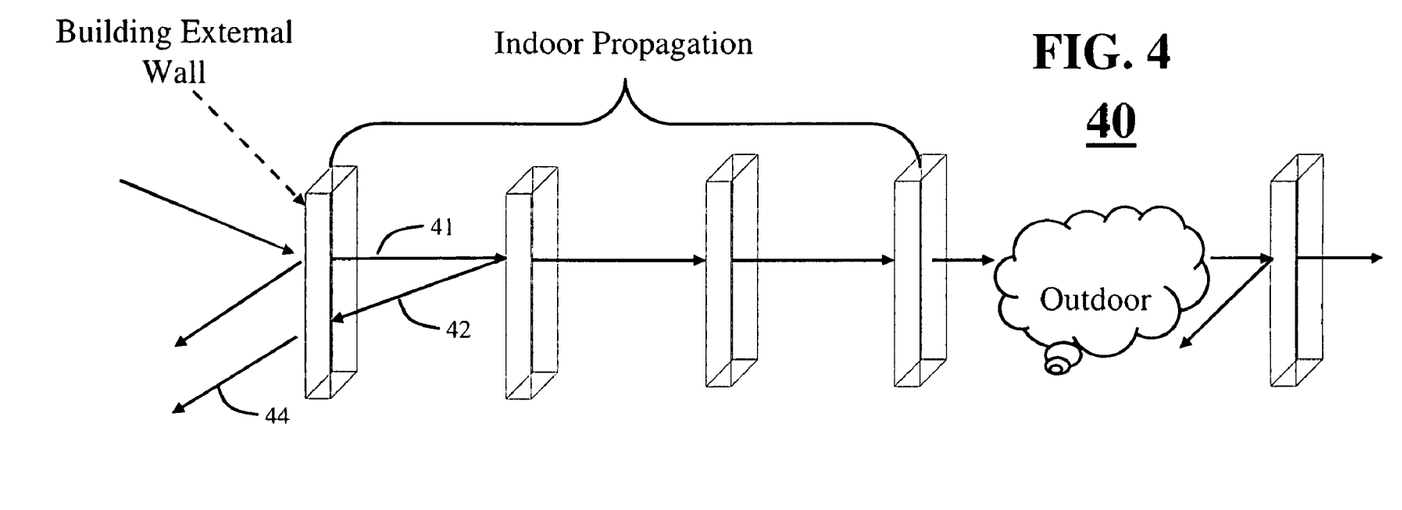
FIG. 4 is an illustration of an environment illustrating different predefined ray propagations as used in accordance with an embodiment of the present invention.

In one embodiment and referring to FIGS. 1, 3 and 4, the tool or tools can initially assign a fixed number of bounces per ray. When a ray hits a facet such as face 12, the software tool or program can read the facet data 13 and then decide if the facet belongs to an exterior or interior building wall. In one embodiment for exterior walls, the number of bounces does not change for the reflected ray (16) and it is increased for the transmitted ray 18. For interior walls both transmitted and reflected rays can be assigned the same number of bounces as the interior incident ray. For example, the mixed environment 30 of FIG. 3 illustrates a fixed number of reflected rays (1) upon hitting an exterior wall and no indoor reflected rays, only indoor transmitted rays. In mixed environment 40 of FIG. 4, the number of transmitted and reflected rays for the interior walls is increased and therefore the system description will include a reflected ray 42 from an indoor incident ray 41 and a transmitted ray 44.

Figure 5:
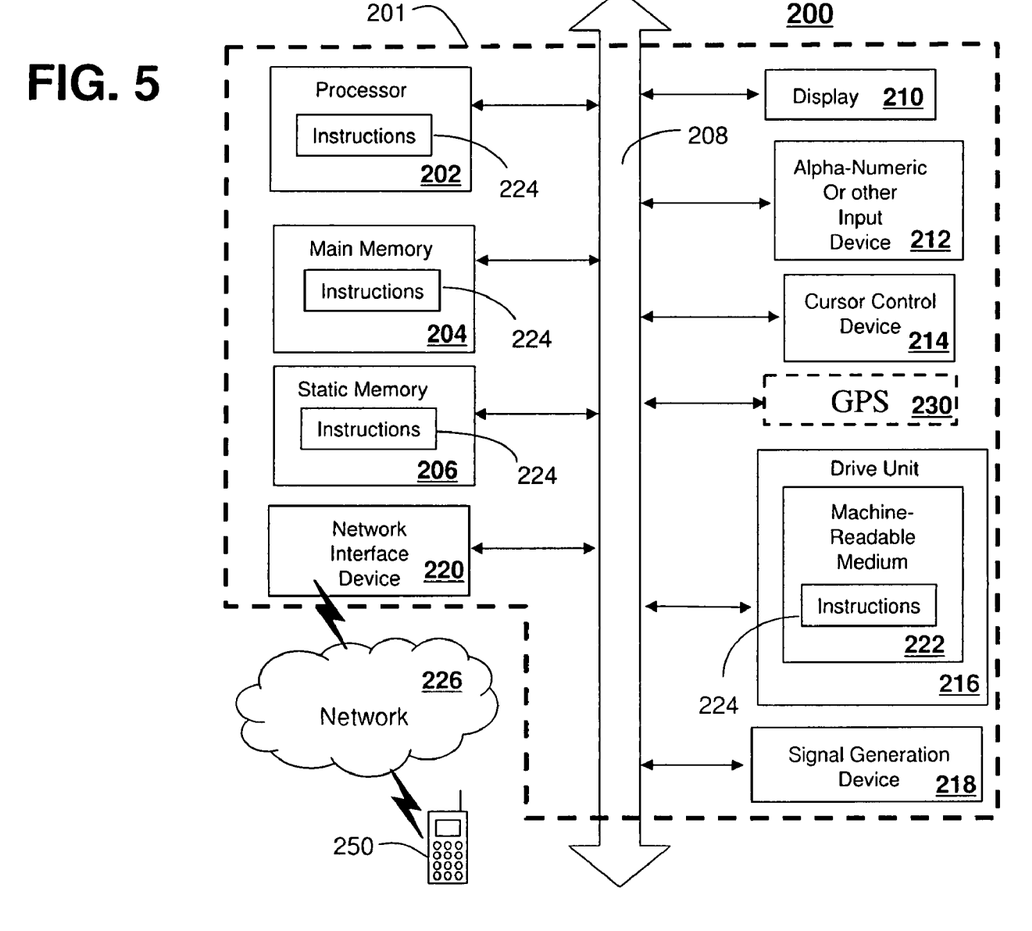
FIG. 5 is a wireless device that can deployed in an area being simulated in accordance with an embodiment of the present invention.

In another embodiment of the present invention as illustrated in the diagrammatic representation of FIG. 5, a computer system 200 or electronic product 201 can include a processor or controller 202 coupled to a display 210. The electronic product 201 can selectively be a wrist-worn device or a hand-held device or a fixed device selected among a cellular phone, a personal digital assistant, a smart phone, an MP3 Player, a music player, a remote controller, a wrist-worn computer, a laptop computer, or a desk-top computer. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa. The computer system can further include a location finding device such as a GPS receiver 230.

The machine may comprise a server computer, a client user computer, a personal computer (PC), a tablet PC, personal digital assistant, a cellular phone, a laptop computer, a desk-top computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the display 210. The computer system 200 may include an input device 212 (e.g., a keyboard, microphone, etc.), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Referring to FIG. 6, a method 600 to enhance the accuracy and speed of a ray launching simulation tool for simulations in a mixed environment by using adaptive ray expansion mechanisms (such as bounces) includes the step 602 of selecting a target area within the mixed environment and modifying the propagation properties of the adaptive ray expansion mechanisms according to characteristics classified for the target area at step 604. The method can further include the step 606 of classifying characteristics for the target area including transmitting and reflecting rays for indoor building regions and for outdoor building regions. The number of bounces (or a power level threshold) assigned to a transmitted ray can be a function of the environment where bounces or rays propagate as noted in step 606. The characteristics classified for the target area can be assigned by a user of the ray launching simulation tool. The characteristics classified for the target area can be assigned by a ray-launching engine of the ray launching simulation tool. The method 600 can use the characteristics classified for the target area at step 608 to determine a number of facets enclosed within a region and their height in order to approximate a density and an average height of buildings in a region. A process of classifying characteristics in a region at step 610 uses the number of facets enclosed within the region and the statistics obtained including the average height of buildings in the region and a standard deviation along with parameters stored in a table in order to classify the environment for the region. In one particular embodiment, the characteristics classified can be based on launching rays along a z-axis from each receiver and determining if the ray intersects a triangular facet in order to decide a percentage of receivers located inside buildings and as a result compute a density and an average height of a building in the region of interest at step 612. The information available on each facet is used to determine exterior and interior regions of an object and thereby resulting in a predetermined number of bounces per ray in a given region. In another aspect a user can select rays as able to penetrate a building structure and to only generate transmissions in order to improve simulation speed without significantly degrading accuracy of simulation results at step 614. Alternatively or optionally, a user at step 616 can select rays as able to penetrate a building structure to only generate transmissions after a preset number of transmissions. Rays can be classified as reflected and transmitted and a number of allowed bounces originally assigned to a transmitted ray is only incremented for reflected rays for both indoor and outdoor but not for transmitted rays inside buildings. Note the target area or a region of interest can be manually input by a user or can be provided by a location finding device externally attached to a device performing the simulation herein at step 618.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method to enhance the accuracy and speed of a ray launching simulation tool for simulations in a mixed environment by using adaptive ray expansion mechanisms, comprising:
    selecting, by a processor, a target area within the mixed environment, wherein the mixed environment includes indoor environment and outdoor environment;
    transmitting at least a ray in the mixed environment; and
    modifying, by the processor, the propagation properties of the adaptive ray expansion mechanisms according to characteristics classified for the target area, wherein the adaptive ray expansion mechanism includes an adjustment of a number of bounces or a power threshold of the at least one transmitted ray within the mixed environment.

2. The method of claim 1, wherein the method further comprises:
    classifying, by the processor, characteristics for the target area including transmitting and reflecting rays for indoor building regions and for outdoor building regions.

3. The method of claim 1, wherein the number of bounces assigned to a transmitted ray, or a power threshold, or a number of rays sent in a given direction is a function of the environment where it propagates.

4. The method of claim 1, wherein the characteristics classified for the target area are assigned by a user of the ray launching simulation tool.

5. The method of claim 1, wherein the characteristics classified for the target area are assigned by a ray-launching engine of the ray launching simulation tool.

6. The method of claim 5, wherein characteristics classified is based on launching rays along a z-axis from each receiver and determining if the ray intersects a triangular facet in order to decide a percentage of receivers located inside buildings and as a result compute a density and an average height of a building in the region of interest.

7. The method of claim 5, wherein the method uses the characteristics classified for the target area to determine a number of facets enclosed within a region and their height in order to approximate a density and an average height of buildings in a region.

8. The method of claim 7, wherein a process of classifying characteristics in a region uses the number of facets enclosed within the region and the statistics obtained including the average height of buildings in the region and a standard deviation along with parameters stored in a table in order to classify the environment for the region.

9. The method of claim 1, wherein the mixed environment has a plurality of facets and information available on each facet is used to determine exterior and interior regions of an object and thereby resulting in a predetermined number of bounces per ray in a given region.

10. The method of claim 9, wherein rays are classified as reflected and transmitted and a number of allowed bounces originally assigned to a transmitted ray is only incremented for reflected rays for both indoor and outdoor but not for transmitted rays inside buildings.

11. The method of claim 1, wherein a user selects rays as able to penetrate a building structure and to only generate transmissions.

12. The method of claim 11, wherein rays are classified as reflected and transmitted and a number of allowed bounces originally assigned to a transmitted ray is only incremented for reflected rays for both indoor and outdoor but not for transmitted rays inside buildings.

13. The method of claim 1, wherein a user selects rays as able to penetrate a building structure to only generate additional transmissions after determining that a preset number of transmissions is reached on striking a facet in the target region.

14. The method of claim 1, wherein the target area or a region of interest is manually input by a user.

15. The method of claim 1, wherein the target area or a region of interest is provided by a location finding device externally attached to a device running performing the steps of claim 1.

16. A simulation tool having enhanced accuracy and speed for simulation using a ray launching in a mixed environment by using adaptive ray expansion mechanisms, comprising:
 a transmitter, coupled to a processor, for transmitting at least a ray in the mixed environment, wherein the mixed environment includes indoor environment and outdoor environment;
 a memory coupled to the processor, wherein the processor is operative to:
  select a target area within the mixed environment; and
  modify the propagation properties of the adaptive ray expansion mechanisms according to characteristics classified for the target area, wherein the adaptive ray expansion mechanism includes an adjustment of a number of bounces or a power threshold of the at least one transmitted ray in the mixed environment.

17. The simulation tool of claim 16, wherein the processor is further operative to classify characteristics for the target area by transmitting and reflecting rays for indoor building regions and for outdoor building regions.

18. The simulation tool of claim 16, wherein the number of bounces or a power level threshold assigned to a transmitted ray is a function of the environment where it propagates.

19. The simulation tool of claim 16, wherein location information is transferred into a device running the simulation via a wireless local area network.

20. The simulation tool of claim 16, wherein the simulation tool determines the target area or a region of interest by using a global positioning service device externally attached to a device performing functions of the simulation tool.

* * * * *